US005209128A

United States Patent [19]

Whelan

[11] Patent Number: 5,209,128

[45] Date of Patent: * May 11, 1993

[54] SAFETY PIPETTE AND ADAPTOR TIP

[75] Inventor: James P. Whelan, Damascus, Md.

[73] Assignee: The United States of America as represented by the Secretary of the Department of Health & Human Services, Washington, D.C.

[ * ] Notice: The portion of the term of this patent subsequent to Oct. 22, 2008 has been disclaimed.

[21] Appl. No.: 628,902

[22] Filed: Dec. 18, 1990

Related U.S. Application Data

[63] Continuation-in-part of Ser. No. 451,689, Dec. 18, 1989, Pat. No. 5,058,441.

[51] Int. Cl.[5] .......... G01N 1/14

[52] U.S. Cl. .......... 73/864.03; 73/864.15

[58] Field of Search .......... 73/864.01, 864.03, 864.11, 73/864.13, 864.14, 864.15, 863.23, 863.24, 863.25

[56] References Cited

U.S. PATENT DOCUMENTS

| | | | |
|---|---|---|---|
| 2,153,105 | 4/1939 | Szecsi | 73/864.11 |
| 2,348,831 | 5/1944 | Mathis | 222/189 |
| 2,376,231 | 5/1945 | Cohn | 222/478 |
| 2,423,173 | 7/1947 | Brady et al. | 222/189 |
| 2,692,503 | 10/1954 | Crecelius | 73/864.03 |
| 2,809,773 | 10/1957 | Bender | 222/158 |
| 2,930,238 | 3/1960 | Kellett | 73/864.03 |
| 3,166,940 | 1/1965 | Allisbaugh et al. | 73/864.03 |
| 3,463,013 | 8/1969 | Reedy | 73/864.15 |
| 3,591,056 | 7/1971 | Griffin | 73/864.18 |
| 3,864,979 | 2/1975 | Ayres | 55/159 X |
| 3,933,048 | 1/1976 | Scordato | 73/864.17 |
| 3,963,061 | 6/1976 | Kenney | 141/21 |
| 3,995,496 | 12/1976 | Bickford | 137/199 X |
| 4,261,205 | 4/1981 | Oshikubo et al. | 422/100 X |
| 4,283,950 | 8/1981 | Tervamäki | 73/864.14 |
| 4,299,795 | 11/1981 | Bates | 73/864.01 |
| 4,461,328 | 7/1984 | Kenney | 141/67 |
| 4,476,016 | 10/1984 | Kiyasu | 210/198.2 |
| 4,487,081 | 12/1984 | De Vaughn et al. | 73/864.13 |
| 4,589,421 | 5/1986 | Ullman | 128/763 |
| 4,806,313 | 2/1989 | Ebersole et al. | 422/61 |
| 4,999,164 | 3/1991 | Puchinger et al. | 73/863.24 X |
| 5,021,217 | 6/1991 | Oshikubo | 73/864.13 X |
| 5,059,398 | 10/1991 | Kenney | 73/864.13 X |
| 5,078,970 | 1/1992 | Teodorescu et al. | 73/864.11 |

FOREIGN PATENT DOCUMENTS

| | | | |
|---|---|---|---|
| 13272 | 5/1956 | Fed. Rep. of Germany | 73/864.01 |
| 297895 | 10/1968 | U.S.S.R. | 73/864.01 |
| 680383 | 10/1952 | United Kingdom | 73/864.15 |

*Primary Examiner*—Tom Noland
*Attorney, Agent, or Firm*—Lowe, Price, LeBlanc & Becker

[57] ABSTRACT

A safety pipette is characterized in that an openable seal (6) is present within the pipette, necessitating the use of a forcing element (9) to hold the seal in an open position in order to use the pipette. Pipette inserts provide the seal in standard pipettes. Pipette adaptors provide the necessary forcing element. Pipette supports or nosepieces for pipetting devices are modified with a pipette adapter (8) allowing the use of safety pipettes. The forcing element is a pin, or rod, firmly made part of a nosepiece, or an adaptor that moves a flap or ball within a pipette away from a closed position into an open position, allowing air flow through the safety pipette. Kits comprise modified nosepieces or replacement elements thereof with safety pipettes per se, or with safety pipette inserts, and kits comprise pipette adaptors with safety pipettes or safety pipette inserts.

20 Claims, 4 Drawing Sheets

SAFETY PIPETTE AND ADAPTOR TIP

This application is a continuation-in-part of application Ser. No. 07/451,689, filed Dec. 18, 1989 now U.S. Pat. No. 5,058,441.

TECHNICAL FIELD

This invention relates to a safety pipette and to an adaptor therefor which do not permit mouth pipetting. The present invention helps to eliminate any risk of self-contamination or exposure of personnel to substances normally transferred by pipetting.

BACKGROUND ART

Current technology lies in a plethora of pipettes such as plastic, glass, serological, Pasteur, transfer pipettes and the like, which are manufactured by various companies, including Becton-Dickinson, Corning, Fisher, Bel-Art, Kimble, Wheaton, and many others.

U.S. Pat. No. 2,930,238 to Kellett discloses a pipette which prevents liquid in the pipette from reaching the user's mouth. In this device a ball is provided which floats upwards on the drawn liquid to seal the mouthpiece.

U.S. Pat. No. 4,461,328 to Kenney discloses a pipette device for multiple pipetting which has a hydrophobic sheet to prevent fluid from traversing too far up the tube. The device can be applied to a manifold for applying a vacuum pressure to pipette tubes through filter paper.

U.S. Pat. No. 4,299,795 to Bates discloses a pipette or sample tube for obtaining a column of liquid at a predetermined height in laboratory applications. Movable valve members such as lead shot are located in the tube between the restriction and the opposite end for cooperating with the restriction and the opposite end for cooperating with the restriction to regain a column of liquid at the level of the valve member and restriction by surface tension effects. Liquid is drawn from the tube by suction to a level substantially above the restriction and when the suction is removed, the liquid is allowed to drain out the end by reason of the imperfect seal formed by the lead shot at the restriction.

U.S. Pat. No. 3,864,979 to Ayres discloses a liquid collection tube such as a blood sedimentation tube which is provided with a barrier plug which will permit air passage but prevents liquid passage beyond the bottom of the barrier plug.

U.S. Pat. No. 2,348,831 to Mathis discloses a safety device for pipettes to prevent liquid from being drawn by suction into the mouth. A safety device 11 is provided for automatically preventing liquid drawn into the tube from coming into contact with the mouth of the user. The device 11 is a member attached to one end of the pipette and provided with a mount piece at the other end. The device is structured so that suction may be created in the pipette and air is permitted to pass but not liquid.

U.S. Pat. No. 2,376,231 to Cohn discloses a pipette of the throw-away type, the pipette being packed at its upper end with a cotton filter to prevent passage of bacteria from the mouth of the user into the liquid in the pipette or vice versa.

U.S. Pat. No. 2,423,173 to Brady et al. discloses a safety pipette adapted to pick up liquid by oral suction comprising a tubular member having a barrier member within an enlarged portion The barrier member is pervious to air when dry and impervious to air and liquid when wet.

U.S. Pat. No. 2,692,503 to Crecelius discloses a pipette for use in laboratory work. The pipette is provided with a constriction near the mouth piece to separate the mouthpiece from the main body of the pipette. The restriction is also to prevent the displacement of a cotton plug which is in place to prevent passage of bacteria into the mouth of the person using the pipette.

U.S. Pat. No. 3,995,496 to Bickford discloses a disposable mouthguard for pipettes to prevent the flow of liquid into the user's mouth. The structure of this device is as shown in the drawings.

U.S. Pat. No. 4,589,421 to Ullman discloses a sampling device comprising a collection tube having a capillary passage. The capillary passage has a collecting and dispensing orifice at one end and a second orifice at the other end. A chamber encloses the second orifice. The device has a small opening to the outside atmosphere which is other than the first orifice, and which also communicates with the capillary tube. Also included are non-compressible means movable with respect to the opening for sealing the opening and forcing air from the chamber through the capillary tube.

All currently available pipettes have the same inherent flaw. The user can mouth pipette with them.

Although common sense dictates against mouth pipetting and the National Institutes of Health (NIH) guidelines, among others, prohibit it, this practice still occurs in most laboratories. The relative inconvenience of obtaining an automatic or manual pipetting device to provide suction for pipettes as well as a lack of common sense always results in some users' disregard for existing regulations This is especially true when the user believes that the liquid to be transferred is innocuous. However, the possibility of mislabeling of bottles and/or misreading of labels is the reason that mouth pipetting is discouraged.

Moreover, accidents happen even in the hands of experienced workers, and in many instances, according to the NIH Chemical Safety Office, liability for these accidents may reside with supervisory personnel. This liability may exist even if the worker disregards specific instructions to the contrary and then an accident occurs.

For these reasons, the availability of a pipette which cannot be used for mouth pipetting removes the possibility of accidents while eliminating the onus of liability.

There are available commercial devices, generally referred to as pipetting devices that are designed to be used with standard pipettes. These devices are attached to sources of vacuum or air. Simpler devices exist which use a syringe concept to create sufficient vacuum to draw liquid up into an attached pipette. However, all of these devices serve to prevent the use of mouth pipetting, as well as to simplify pipetting.

The internal operating mechanisms of these pipetting devices are well known in the art and do not form any part of the invention herein.

Most existing pipette devices are adapted to work with standard pipettes. Generally the section of such pipette devices into which an end of a pipette is inserted is referred to as a "nosepiece". The specific structure of these devices vary between manufacturers, but all function similarly. Some nosepieces contain various sized spaced rings formed along the inner walls of the nosepiece The function of the rings is to frictionally hold the pipette in place within the nosepiece. Some nosepieces do not have such rings, but incorporate the concept of tapering the inner walls of the nosepiece such that at some point the pipette will be frictionally and tightly engaged by the inner wall. Some nosepieces use both concepts simultaneously. Many nosepieces provided by various manufacturers incorporate various filters, usually near the top section of the nosepiece, to prevent pipetted liquid from being drawn into the body of the pipette device. Some nosepieces contain check valve devices to prevent liquid being drawn into the body of the pipette device. U.S. Pat. No. 3,963,061, at FIGS. 3, 4 and 5, and column 3, lines 47 to 63, describes the operation of such a device

DISCLOSURE OF INVENTION

Figure 1:
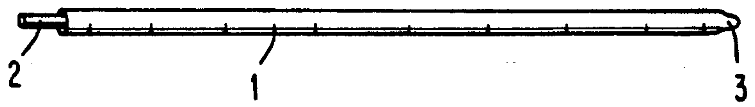
FIG. 1 PRIOR ART
FIG. 1 is a horizontal view of a standard pipette.

This invention arose from a desire by the inventor to improve on state of the art technology for pipetting fluids in a laboratory. The present invention provides a safety pipette, a safety pipette insert, and nosepieces for pipetting devices wherein the safety pipette is designed so that the user is prevented from mouth pipetting fluids. In order to utilize the present technology, a user must employ a standard pipetting device to withdraw fluids into a pipette.

In accordance with one embodiment of this invention, there is described a safety pipette, a safety pipette insert and a nosepiece adaptor intended to be used with either the pipette, or with the insert arranged within the pipette. The safety pipette comprises a translucent tube provided with first and second ends, the first end being an elongated passageway of substantially smaller diameter than the tube and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means being capable of adopting at least a closed position, and an open position into which the sealing means must be forced; and means for closing the sealing means, said closing means being mounted in the tube at a position between the second end thereof and the sealing means, wherein when (1) the first end of the pipette is immersed in a fluid, (2) the sealing means is forced to the open position and (3) the second end is connected to a suction means, the fluid is suctioned into the pipette.

In still a further embodiment, the present invention is directed to a disposable safety pipette insert which comprises a translucent hollow tube provided with first and second ends, a length shorter than a pipette and an outer diameter permitting the tube to sealably fit first end in the suction end of the pipette, with the second end of the tube being flush with said suction end;

a porous barrier plug mounted in the tube at a position close to the first end of the tube and held in such position;

sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position, air can flow in and out of the tube.

The present invention also provides a safety pipette adaptor, comprising an annular forcing means comprising a sleeve having an internal diameter capable of being tightly mounted on the suction end of a pipette, said sleeve permitting the passage of air therethrough and being provided with a rod which is positioned in the direction of an axis for insertion of the sleeve in the pipette, and being provided with a fitting for connecting to a suction means positioned opposite the rod.

The present invention also includes a kit, comprising at least one disposable pipette insert and at least one safety pipette adaptor therefor.

Further included is a kit comprising at least one disposable safety pipette and at least one safety pipette adaptor therefor. The device is intended to be used with any of the pipette suctioning devices now obtainable.

However, as described, the safety pipette adaptor need not be so used. It is possible to use one's mouth at the suction end. What is needed are adaptors specifically designed to fit existing pipetting devices. It is best if the adaptor, or the concept of an adaptor is made part of a device and works only when in proper position in a device.

In one aspect of the invention, there is provided herein a disposable pipette which comprises a translucent tube provided with first and second ends, the first end being an elongated passageway of substantially smaller diameter than the tube and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means capable of adopting at least a closed position, and an open position into which the sealing means must be forced to; and means for closing the sealing means, said closing means being mounted in the tube at a position between the second end thereof and the sealing means, wherein when the sealing means is forced to the open position and the second end is connected to a suction means, the fluid is suctioned into the pipette.

DESCRIPTION OF PREFERRED EMBODIMENTS

Figure 11:
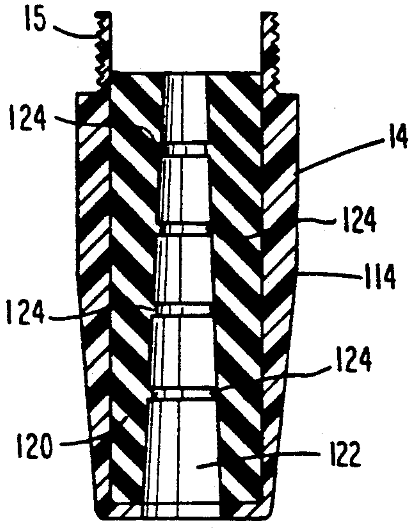
FIG. 11 PRIOR ART
FIG. 11 is a sectional view of a typical nosepiece (14) of a conventional device. It is provided with a cylindrical inner housing (120) which is engaged with the inner periphery of housing 114. Inner housing is provided with axial bore 122, the walls of which taper inwardly. A series of spaced rings (124) are formed along the inner periphery of the bore to selectively engage and hold pipettes. This nosepiece is threaded. (15) at its upper portion to engage a threaded bore of a pipetting device.

This disposable pipette cannot be utilized by itself for pipetting. If mouth pipetting is attempted, no upward flow of fluid will be observed. In order for this pipette to withdraw fluid from a vessel, it is necessary to use a nosepiece adapted to function with known pipetting devices or a nosepiece of a known pipetting device, said nosepiece incorporating a pin or rod such that when the pipette is inserted into the nosepiece, the pin or rod displaces the sealing means of the pipette or the pipette insert into an open position. FIG. 11 shows a generalized view of a nosepiece designed for a known commercial pipetting aid. This basically comprises a cylindrical outer housing 114, the upper portion of which is reduced and threaded (15) for engagement with a complementary threaded bore of the barrel portion of a housing which contains the working elements of the pipetting device. The nosepiece 14 is provided with a cylindrical inner housing 120, the outer periphery of which is engaged with the inner periphery of housing 114. Inner housing 120 is preferably made of rubber or other friction material and is provided with an axial bore 122, the walls of which taper inwardly from the lower to the upper end of the pipette-supporting portion. A series of spaced rings 124 are formed along the inner periphery of the bore to selectively engage and frictionally hold pipettes 16 of various sizes within the pipette-supporting portion.

It is apparent that spaced rings 124 are not necessary, since the tapering of the walls would hold a pipette securely, by friction.

It is also apparent that threads are not required, if the housing of the pipetting device is not threaded. If the housing of the pipetting device allows for friction fitting a nosepiece, the nosepiece need only be provided with the necessary structure to fit the housing. Within the nosepiece, there are various positions that can be modified. In one preferred form the nosepiece contains a tissue culture filter (17) contained within a plastic housing (18). The housing is equipped with a hollow bottom extension (15), allowing air flow through the filter. A stainless steel extension (16) can be tightly inserted into this extension of the filter housing. The extension is hollow to allow air flow through the system. The length of the extension is a function of the position of the housing within the nosepiece, and a function of the diameter of the pipette per se, since a small diameter pipette would extend further up into the nosepiece than a larger diameter pipette. If desired, several such filter units can be provided, each having pins or rods of a different length in order to accommodate different capacity or different sized pipettes.

As a general rule, all of the various elements of nosepieces, as well as the entire nosepiece itself are easily replaceable units, since the nosepiece becomes contaminated by the liquid pipetted and must be cleaned, sterilized or otherwise treated after each use. Therefore, several nosepieces can be maintained, one being used while one or more others are treated for reuse. Also, the various filter units are easily replaced, since the filters, once wetted by liquid, cannot be easily reused. The same is true of valve devices.

This easy replaceability of nosepieces as well as various internal elements thereof provides a convenient method of adapting nosepieces per se of conventional design or of existing replacement parts therefore in order that this safety pipette described herein can be used with such nosepieces which of necessity, requires the use of the pipetting device itself. The modification consists of providing forcing means within the nosepiece, with said forcing means moving the sealing means of a safety pipette, thereby permitting the passage of air in and out of the pipette.

Said modified nosepieces or modified replacement elements can be provided with one or more safety pipettes or safety pipette inserts.

It is not necessary that an entire nosepiece unit by supplied with the safety pipette or safety pipette insert. Existing replacement parts can be provided equipped with the necessary forcing means. The specifics of such modifications are a function of the part per se, but a person skilled in the art can easily determine various embodiments.

The rod or forcing means may be solid or hollow. If the nosepiece design allows free air passage through the nosepiece if a forcing means is present, the forcing means may be solid. If the nosepiece design does not allow free air passage if a forcing means is present, the forcing means can be hollow. If the forcing means is hollow, it should preferably be made of a metal, such as stainless steel, in order to provide sufficient mechanical strength.

The position of the forcing means within the nosepiece is not critical, but of course the size of the pipette with relation to the nosepiece must be considered. It is merely necessary that the forcing means extend far enough into the pipette end to move the sealing means within the pipette into an open position.

The modified nosepiece and/or modified replacement parts therefore can be constructed of any material conventional in the art. It is merely necessary to consider the necessity of autoclaving or cleaning the materials, of providing the necessary tight friction fit of the pipette within the nosepiece and of having sufficient mechanical strength built into the forcing means and any support therefore to allow the means to function properly.

Figure 12:
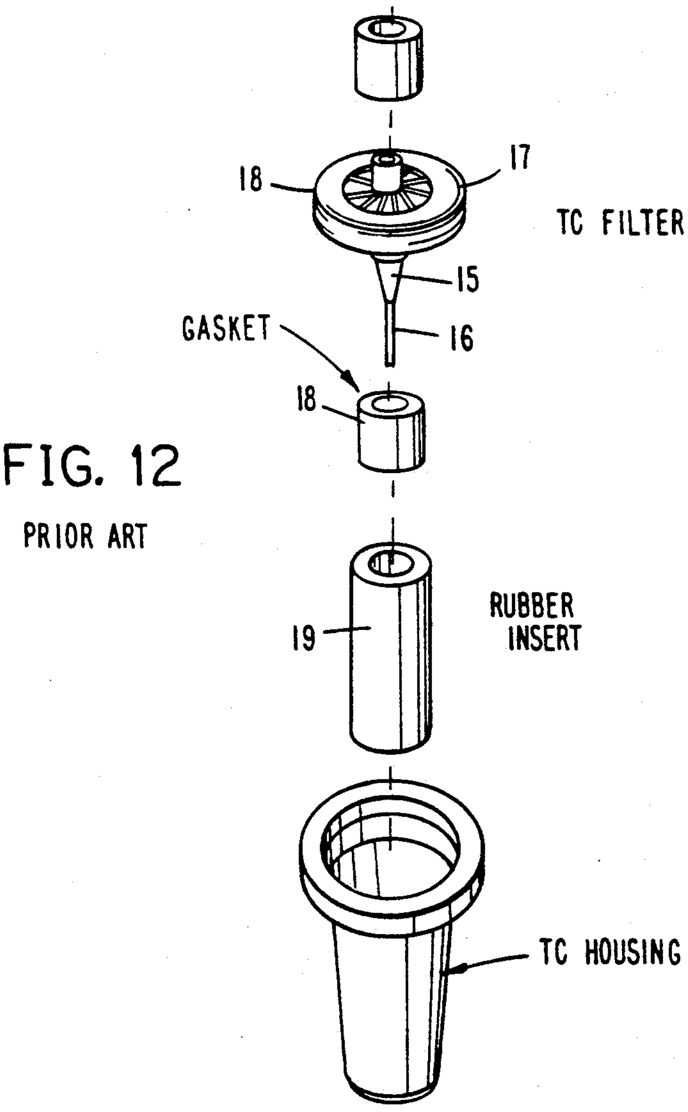
FIG. 12 PRIOR ART
FIG. 12 is a view of a tissue culture filter (17) of a known pipetting device. The filter per se is enclosed within plastic housing 18. Passage 15 allows air flow through the system. Said passage 15 has been modified by the insertion into its bore of a tightly fitting hollow stainless steel rod or pin (16) which serves as forcing means. Note also that gaskets 18 and 19 are provided.

Another possible modification of existing nosepieces is to provide a rubber or plastic insert that fits tightly within the inner diameter of the nosepiece and far enough up into the nosepiece so as to not interfere with the insertion of a safety pipette. Said insert must have an air passageway to allow air to flow from the pipette device housing to the pipette. A hollow pin or rod is tightly fitted into the air passage, similarly to the modification of a filter housing as described above. The design of the tissue culture filter of FIG. 12 shows gaskets 18 and 19 which could be adapted to tightly hold a hollow stainless steel pin similar to that inserted into filter housing 17. It is also apparent that any one of spaced rings 124 can be modified with crosspieces of the general nature shown in FIG. 6 and that the pin or rod is attached to the crosspieces by any suitable means providing sufficient mechanical strength.

If modified replacement parts for existing nosepieces are provided, it is not necessary to consider the methods of attaching the nosepiece to the pipetting device. If a modified nosepiece per se is provided, the nosepiece must be provided with means designed to attach the nosepiece to the device. It would then be necessary to specify the specific pipetting device for which the modified nosepiece is intended.

The details set forth above are to be regarded as merely explanatory. The specific method of construction, or material of construction is not critical. It is merely necessary that the nosepiece, or nosepieces if more than one type of pipetting device is available, be attachable to the housing of the pipetting device. If necessary, an adaptor can be easily designed by one skilled in the art permitting the attachment of a nosepiece to a housing. Also, it is merely necessary, given a nosepiece design that a pin or rod of sufficient strength and length be attached at some point within the nosepiece.

In a particularly preferred embodiment of the disposable pipette of the invention, the sealing means (8) is a circular plate having a diameter smaller than the inner diameter of the tube, wherein when the circular plate is closed against the closing means (10) (14), a tight seal is produced that impedes any passage of liquid or gas through the tube.

The circular plate may be movably attached to the tube at one or two points (7). When attached at two points, the two points are opposite one another.

In still another preferred embodiment, the sealing means is an unattached stopper (11), wherein when the stopper is displaced towards the closing means, a tight seal is produced which impedes the passage of liquid or gas through the tube. In a particularly preferred embodiment, the stopper is a sphere such as a plastic sphere.

The closing means provided in the pipette may be a circular rib (10)(14) attached to the tube. However, it may have any other form as long as when the sealing means is displaced towards the closing means a tight seal is attained.

The pipette may be made of any material which is translucent and inert to the liquids that are to be pipetted in the laboratory. Particularly preferred materials are glass and plastics. These materials have been used in the art for the manufacture of pipettes and their compositions or methods of making the pipettes need not be detailed herein.

The disposable pipette of the invention may be further graduated so that the volume of fluid drawn into it may be ascertained.

Any materials known as suitable for building adaptors for pipettes may be utilized. Preferred are elastomeric materials, among others.

Still another aspect of the invention provides a disposable pipette insert (2) which comprises a translucent hollow tube provided with first and second ends, a length shorter than a pipette and an outer diameter permitting the tube to sealably fit the first end into the suction end of the pipette with the second end of the tube being flush with said suction end;

a porous barrier plug (4) mounted in the tube at a position close to the first end of the tube and held in such position;

sealing means (8 or 11) operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position, air can flow in and out of the tube.

This disposable insert is similar to the translucent tube described above as part of the diameter safety pipette of the invention. In general, the characteristics provided for the above translucent tube may be applied to the present pipette insert.

The length and diameter of the translucent tube (pipette insert or the first end of the pipette) can be ascertained from the Figures. Preferably, the diameter is such that it fits inside the suction end of the pipette or alternatively, it is built into the pipette when the latter is manufactured. The length of the tube should only extend through the suction end of the pipette and not interfere with the graduated portion and/or when not graduated, the reservoir portion of the pipette. By means of example, for a 10 ml pipette, the length of the translucent tube may be about 2 to 5 cm, and more preferably about 3 to 4 cm. Similarly, the length of the tube can be determined by an artisan for different volume pipettes. Other lengths, however, may also be utilized as found suitable.

In a preferred embodiment of the invention, the disposable pipette insert is made of an elastomeric material, the porous barrier is glass wool, the closing means is a circular rib, and the sealing means may be a circular plate and/or a stopper such as a spherical stopper which fits tightly against the rib.

Also provided herein are various kits which may be sold in the marketplace.

In one embodiment, a kit is provided herein which comprises at least one disposable pipette insert comprising a translucent hollow tube provided with first and second ends, a length shorter than a pipette and an outer diameter permitting the tube to sealably fit first end into the suction end of the pipette, with the second end of the tube being flush with said suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position air can flow in and out of the tube; and a nosepiece adapted to function with a pipetting device said nosepiece comprising a pipette support housing (3) having an internal diameter capable of tightly fitting on the suction end of a pipette, said nosepiece permitting the passage of air therethrough and being provided with a rod (9) which is positioned in the direction of an axis for insertion into this safety pipette, said rod serving to displace the sealing means (6 or 11) within the pipette or insert into an open position. Although the nosepiece, or modified nosepiece may be disposable, it is preferred that it be reused with several pipettes or pipette inserts.

In one particularly preferred embodiment of the invention, the safety pipette nosepiece is not disposable and it may be re-used with several pipettes or pipette inserts in accordance to this invention.

In another preferred embodiment of the kit, several nosepieces are provided therein along with about 1 to 20 dozen disposable pipette inserts, and more preferably 1 to 10 dozen disposable pipette inserts.

In another preferred embodiment, the kit further comprises at least one pipette of a size which is compatible with the nosepiece. When the kit comprises disposable pipettes, the pipettes are provided in an amount of about 1 dozen to 20 dozen, and more preferably about 1 to 10 dozen pipettes.

Also provided herein is a kit, which comprises at least one nosepiece and at least one disposable pipette which comprises a translucent tube provided with first and second ends, the first end being an elongated passageway of substantially smaller diameter than the tube and the second end positioned opposite the first end being vented to permit the passage of air in and out of the tube, a porous barrier plug mounted in the tube at a position close to the second end thereof, sealing means operably mounted in the tube at a position between the second end thereof, and the barrier plug, said sealing means being capable of adopting at least a closed position, and an open position into which the sealing means must be forced, and means for closing the sealing means, said closing means being mounted in the tube at a position between the second end thereof and the sealing means, wherein when the first end of the pipette is immersed in a fluid, when the sealing means is forced to the open position and when the second end is connection to a suction means, the fluid is suctioned into the pipette, wherein the nosepiece provided herein by itself or as part of a kit may be disposable or non-disposable. More resilient materials can be utilized for non-disposable nosepieces which are somewhat more expensive. These are known in the art and need not be described herein. The kits may be provided in a package such as a sealed bag or box. In a preferred embodiment, the kit components are sterile.

Now, the invention will be further described with reference to the Figures.

FIG. 1 shows a standard pipette held horizontally. The parts of the pipette shown in the Figure are the body (1), the suction end of the pipette or pipetting device attachment (2) and the aspiration/dispensing tapered end (30) of the pipette.

Figure 2:
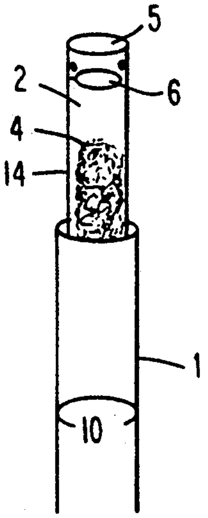
FIG. 2 is an expanded view of the suction end of a standard pipette (1) and the pipette insert of the invention (2).
Figure 3:
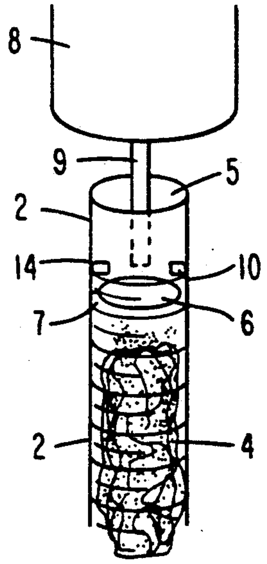
FIG. 3 is a further expanded vertical view of the pipette insert of the invention (2) and the lower end of a pipette adaptor of the type described in application Ser. No. 07/451,689 as it is being inserted into the second end (5) of the pipette insert (2).

FIG. 2 is an expanded view of the pipette insert of the invention shown outside of the pipette (1). The parts shown in FIG. 2 are a porous barrier plug such as cutin or glass wool (4), the second end (5) of the translucent tube and the sealing means (6). In this Figure, the pipette insert is in the process of being inserted into the pipette (1). Shown in the Figure is also the closing means (10) mounted in the pipette. The translucent tube (14) must be inserted so that the closing means are positioned between the suction or second end (5) of the translucent tube and the sealing means (6). This is shown in FIG. 3. In this Figure, it is shown how the pipette is inserted into the nosepiece 8. In this Figure, pin or rod 9 has been exaggerated in length in order to show how it is inserted into the pipette end.

Shown in FIG. 3 are the porous barrier plug (4), the circular plate (6) which is an embodiment of the sealing means, the closing means shown as a rib (10)(14) around the inner face of the tube, a tab (7) holding the circular plate onto the pipette insert (2), and the means (9) for forcing the circular plate open.

Figure 4:
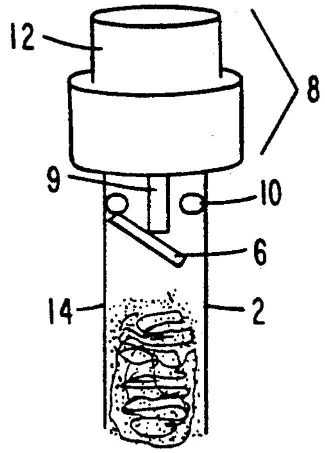
FIG. 4 is a vertical view of one embodiment of the pipette insert (2) with the pipette adaptor of the type described in application Ser. No. 07/451,689 inserted therein. This embodiment has a sealing means which is a circular plate (6) shown herein in the open position.
Figure 5:
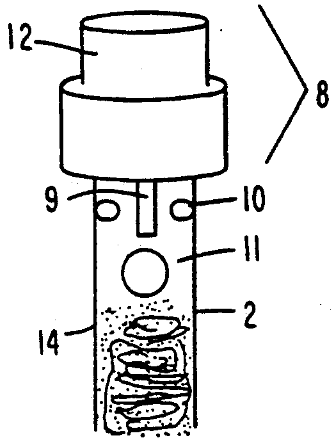
FIG. 5 shows another embodiment of the pipette insert (2) where the sealing means is a spherical stopper (11), with the spherical stopper being forced into the open position.

FIGS. 4 and 5 show how the pipette adaptor functions. Forcing means 9 is shown holding sealing means 6 or 11 in an open position.

Figure 6:
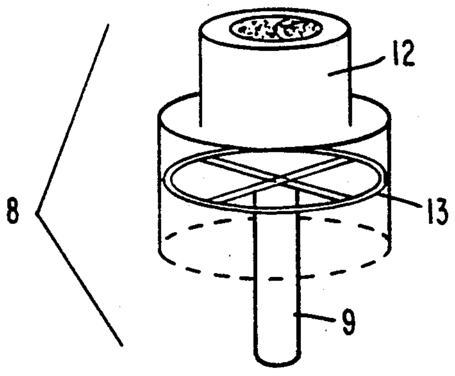
FIG. 6 is an embodiment of the pipette adaptor of application Ser. No 07/451,689 showing the suction end (12) of the adaptor, the means (9) for forcing the sealing means to the open position, and an optional cross-support (13) for the forcing means (9).

FIG. 6 is an expanded cut-away view of one embodiment of the pipette adaptor of the invention. The Figure shows the suction end (12) of the adaptor, a cross-support (13) for the forcing means in the form of a bar (9). The cross-support (13) is intended for holding the bar (9) in place. The fact that the cross-support is not a solid plate is purposely designed so that it will permit the passage of air in and out of the pipette insert (2).

Figure 7:
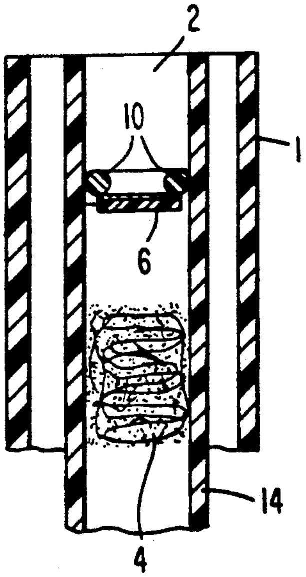
FIG. 7 is a generalized cut away view of the nosepiece of a pipetting device of the prior art modified to include pin or rod (9).

FIG. 7 is a generalized cut away view of the nosepiece (3) of a pipetting device of the prior art modified to include pin or rod (9). Pin or rod (9) is shown attached at the upper end of the nosepiece, wherein the point of attachment of the rod may be a rubber gasket or insert similar to items 18 or 19 of FIG. 12, or a filter housing (item 18 of FIG. 12).

Figure 8:
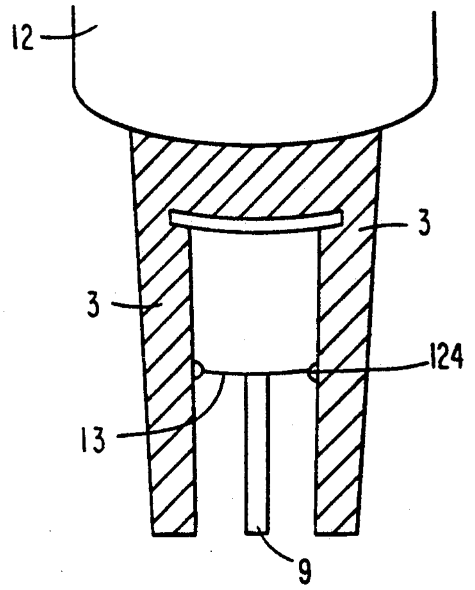
FIG. 8 is another generalized cut away view of the nosepiece of a pipetting device of the prior art to include pin or rod 9, wherein the pin or rod is attached to or is part of ring 8.

FIG. 8 is a generalized cut away view of a nosepiece (3) of a pipetting device of the prior art modified to include a pin or rod (9). Pin or rod (9) is shown attached to or is part of ring 124.

Figure 8A:
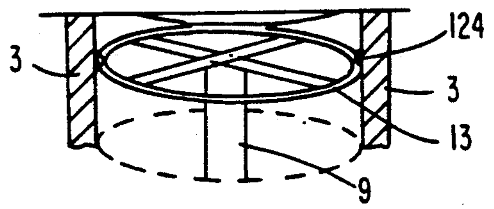
FIG. 8A is a generalized embodiment of a nosepiece showing cross-support 13 attached to or made part of a ring (124) formed along the inner periphery of the base.
Figure 9:
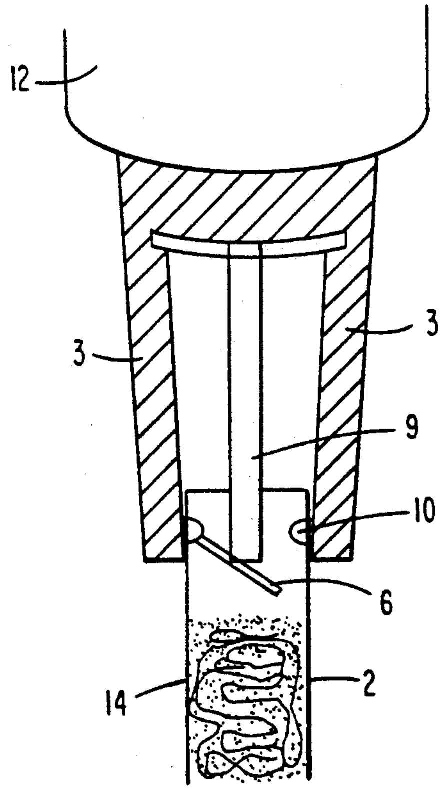
FIG. 9 is a vertical view of one embodiment of a pipette with a pipette insert (2) placed in position within nosepiece 3. This embodiment has a sealing means which is a circular plate (6) forced into the open direction by forcing means (9).
Figure 10:
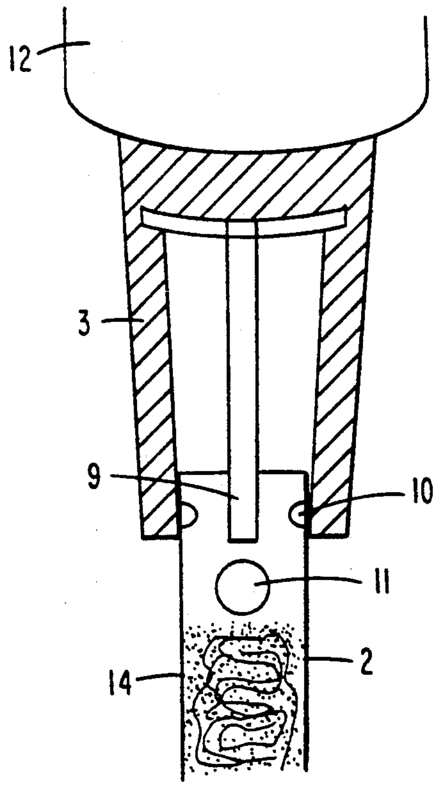
FIG. 10 is another embodiment of a pipette insert (2) placed in position within nosepiece (3). In this embodiment, the spherical stopper (11) is forced into an open position

FIG. 8A shows a method of construction showing cross-support 13 attached to or part of ring 124 formed along the inner of the bore.

FIGS. 9 to 12 explained above.

It is seen that the modification of nosepieces fall into three categories. In one form, a nosepiece housing is modified to contain the forcing means. The modification of FIGS. 8 and 8A are directed thereto. In another form, the modification is that of a replacement part. The modification of FIG. 12 is typical.

In a third form, a gasket, bushing, ring or other means capable of tightly holding the forcing means is placed within the nosepiece so as not to interfere with any of the designed operations of the nosepiece and so placed as not to interfere with the insertion of safety pipettes.

The invention now being fully described, it will be apparent to one of ordinary skill in the art that many changes and modifications can be made thereto without departing from the spirit or scope of the invention as set forth herein.

Claims:

1. A nosepiece for a pipetting device comprising a generally cylindrical housing having an internal diameter capable of tightly engaging a suction end of a pipette, said nosepiece being provided with a rod positioned in the direction of an axis for insertion into the pipette, wherein said rod is capable of displacing into an open position a sealing means in the pipette or in a pipette insert positioned within the pipette, said rod being provided with fitting means for connection to the pipetting device.

2. A nosepiece as claimed in claim 1 wherein the rod is an integral part of the nosepiece, or a part of a replacement element within the nosepiece, or a part of an element inserted within the nosepiece.

3. A kit, comprising at least one nosepiece as claimed in claim 2, and at least one disposable pipette insert comprising a translucent hollow tube provided with first and second ends, a length shorter than the pipette and an outer diameter permitting the tube to sealably fit first end into the suction end of the pipette, with the second end of the tube being flush with the suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position, air can flow in and out of the tube;

the at least one nosepiece being of a size compatible with the at least one pipette insert.

4. A kit as defined by claim 3, wherein the sealing means is a circular plate having a diameter smaller than the inner diameter of the tube, and wherein when the circular plate is closed against the closing means a tight seal is produced that impedes any passage of liquid or gas through the tube.

5. A kit as defined by claim 3, wherein the sealing means is an unattached stopper, and wherein when the stopper is displaced towards the closing means a tight seal is produced that impedes any passage of liquid or gas through the tube.

6. The pipette of claim 5, wherein the closing means comprises a circular rib attached to the tube and wherein the tube is a transparent plastic tube.

7. A kit as defined by claim 3, wherein the closing means comprises a circular rib attached to the tube and wherein the tube is a transparent plastic tube.

8. A kit, comprising at least one nosepiece as claimed in claim 2 and at least one disposable pipette comprising a translucent tube provided with first and second ends, the first end being an elongated passageway and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means capable of adopting at least a closed position, and an open position into which the sealing means must be forced; and means for closing the sealing means, said closing means being mounted in the tube at a position between the second end thereof and the sealing means, wherein when a first end of the pipette is immersed in a fluid, when the sealing means is forced to the open position and when a second end of the pipette is connected to a suction means, the fluid is suctioned into the pipette, at least one of the nosepieces being of a size compatible with at least one pipette.

9. A kit as defined by claim 8, wherein the sealing means is a circular plate having a diameter smaller than the inner diameter of the tube, and wherein when the circular plate is closed against the closing means a tight seal is produced that impedes any passage of liquid or gas through the tube.

10. A kit as defined by claim 8, wherein the sealing means is an unattached stopper, and wherein when the stopper is displaced towards the closing means a tight seal is produced that impedes any passage of liquid or gas through the tube.

11. A kit as defined by claim 8, wherein the closing means comprises a circular rib attached to the tube and wherein the tube is a transparent plastic tube.

12. A disposable pipette, comprising a translucent tube provided with first and second ends, the first end being an elongated passageway of substantially smaller diameter than the remainder of said tube and the second end positioned opposite the first end being vented to permit the passage of air in and out of the tube;

a porous barrier plug mounted in the tube at a position close to the second end thereof;

sealing means operably mounted in the tube at a position between the second end thereof and the barrier plug, said sealing means being capable of adopting at least a closed position and an open position into which the sealing means must be forced; and means for closing the sealing means, said closing means being mounted in the tube at a position between the second end thereof and the sealing means, wherein when the first end of the pipette is immersed in a fluid, when the sealing means is forced to the open position and when the second end is connected to a suction means, the fluid is suctioned into the pipette.

13. The pipette of claim 12, wherein the sealing means is a circular plate having a diameter smaller than the inner diameter of the tube, and wherein when the circular plate is closed against the closing means a tight seal is produced that impedes any passage of liquid or gas through the tube.

14. The pipette of claim 12, wherein the sealing means is an unattached stopper, and wherein when the stopper is displaced towards the closing means a tight seal is produced that impedes any passage of liquid or gas through the tube.

15. The pipette of claim 12, further comprising an annular sleeve operably and sealably mounted on the second end of the tube, said sleeve provided with means for forcing the sealing means to the open position, and being open to permit the passage of air in and out of the tube.

16. The pipette of claim 12, wherein the forcing means is a rod extending vertically into the tube.

17. A kit, comprising at least one disposable pipette as claimed in claim 12, and at least one safety pipette adaptor comprising an annular sleeve having an internal diameter capable of being tightly mounted on the suction end of the at least one pipette, said sleeve permitting the passage of air therethrough and being provided with a rod which is positioned in the direction of an axis for insertion into the at least one pipette, wherein said rod is capable of displacing into an one position the sealing means in the pipette, said rod being provided with a fitting for connection to the suction means positioned opposite the rod;

wherein the adaptor and the at least one pipette are of compatible sizes.

18. A safety pipette adaptor, comprising an annular sleeve having an internal diameter capable of being tightly mounted on a suction end of a pipette, said sleeve permitting the passage of air therethrough and being provided with a rod, which is positioned in the direction of an axis for insertion of the sleeve in the pipette, wherein said rod is capable of displacing into an open position a sealing means in the pipette or in a pipette insert positioned within the pipette, said rod being provided with a fitting for connecting to a suction means positioned opposite the rod.

19. A kit, comprising at least one safety pipette adapter as claimed in claim 18, and at least one disposable pipette insert comprising a translucent hollow tube provided with first and second ends, a length shorter than the pipette and an outer diameter permitting the tube to sealably fit first end into the suction end of the pipette, with the second end of the tube being flush with said suction end, a porous barrier plug mounted in the tube at a position close to the first end of the tube and held in such position, sealing means operably mounted in the tube at a position between the second end thereof and the barrier plug, said sealing means being capable of adopting at least a closed position and an open position into which it must be forced, and means for closing the sealing means, said closing means being mounted in the tube at a position between the second end thereof and the sealing means; wherein when the sealing means is forced into the open position, air can flow in and out of the tube;

said at least one pipette insert and said at least one pipette adaptor being of compatible sizes.

20. A disposable pipette insert, comprising a translucent hollow tube provided with first and second ends, a length shorter than a pipette and an outer diameter permitting the tube to sealably fit the first end into a suction end of the pipette with the second end of the tube being flush with said suction end;

a porous barrier plug mounted in the tube at a position close to the first end of the tube and held in such position;

sealing means operably mounted in the tube at a position between the second end thereof and the barrier plug, said sealing means being capable of adopting at least a closed position and an open position into which it must be forced; and means for closing the sealing means, said closing means being mounted in the tube at a position between the second end thereof and the sealing means, wherein when the sealing means is forced into the open position, air can flow in and out of the tube.

* * * * *